United States Patent
Hsieh et al.

(10) Patent No.: US 10,604,248 B2
(45) Date of Patent: Mar. 31, 2020

(54) ROTATING APPARATUS

(71) Applicant: Coretronic Intelligent Robotics Corporation, Hsinchu County (TW)

(72) Inventors: Chi-Tong Hsieh, Hsinchu County (TW); Ying-Chieh Chen, Hsinchu County (TW); Hsu-Chih Cheng, Hsinchu County (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 53 days.

(21) Appl. No.: 15/964,025

(22) Filed: Apr. 26, 2018

(65) Prior Publication Data

US 2018/0327088 A1 Nov. 15, 2018

(30) Foreign Application Priority Data

May 10, 2017 (CN) .......................... 2017 1 0324830

(51) Int. Cl.
*B64C 27/50* (2006.01)
*B64C 27/14* (2006.01)
*B64C 39/02* (2006.01)
*B64C 27/16* (2006.01)

(52) U.S. Cl.
CPC .............. *B64C 27/50* (2013.01); *B64C 27/14* (2013.01); *B64C 27/16* (2013.01); *B64C 39/024* (2013.01); *B64C 2201/108* (2013.01); *B64C 2201/165* (2013.01)

(58) Field of Classification Search
CPC .......... B64C 27/50; B64C 27/14; B64C 27/16
See application file for complete search history.

(56) References Cited

U.S. PATENT DOCUMENTS

| 2006/0067822 A1* | 3/2006 | D'Anna | B64C 27/50 |
| | | | 416/98 |
| 2016/0167778 A1* | 6/2016 | Meringer | B64C 27/10 |
| | | | 244/17.23 |
| 2016/0347441 A1* | 12/2016 | Wainfan | B64C 11/28 |
| 2017/0166302 A1* | 6/2017 | Shiosaki | B64C 27/14 |
| 2018/0079485 A1* | 3/2018 | Kooiman | B64C 3/56 |

FOREIGN PATENT DOCUMENTS

| CN | 204956909 | | 1/2016 | |
| CN | 104088446 | | 6/2016 | |
| GB | 2550916 | A * | 12/2017 | ............. B64C 11/28 |
| TW | M489677 | | 11/2014 | |

* cited by examiner

*Primary Examiner* — Woody A Lee, Jr.
(74) *Attorney, Agent, or Firm* — JCIPRNET

(57) ABSTRACT

A rotating apparatus includes a rotating assembly and a position-limiting assembly. The rotating assembly includes a driving unit and at least one rotating component. The driving unit is adapted to drive the rotating component to rotate with a first axis. The position-limiting assembly includes a position-limiting component, at least one first column, and a buckling component. The position-limiting assembly is disposed on the rotating assembly and is adapted to limit a position of the rotating component. The first column is connected to the position-limiting component. The position-limiting component is located between the rotating component and the buckling component and is able to move along the first axis. The buckling component is movably disposed on the position-limiting component and has at least one buckling portion. The buckling portion is adapted to be buckled to the first column or move away from the first column.

17 Claims, 3 Drawing Sheets

ROTATING APPARATUS

CROSS-REFERENCE TO RELATED APPLICATION

This application claims the priority benefit of China application serial no. 201710324830.3, filed on May 10, 2017. The entirety of the above-mentioned patent application is hereby incorporated by reference herein and made a part of this specification.

BACKGROUND OF THE INVENTION

Field of the Invention

The invention relates to a rotating apparatus, particularly a foldable rotating apparatus.

Description of Related Art

As technology advances, researching costs for unmanned aerial vehicles (UAV) decrease. The UAVs that are originally applied in the military field are thus applied in more and more fields such as goods, food transportation and sports photography. Thereby, the market of UAV will create a great number of job vacancies and bring considerable economic benefit. Generally, the UAVs fly with the help of propeller. However, as the airframes increase in size, the sizes of propellers thereby grow. For the convenience in storage, the propeller blades of propellers can be designed to be foldable or detachable.

With regards to foldable propeller blades, the propeller blades may be fixed with the help of screws, so that the propeller blades can be folded by rotating with the screw serving as an axis. Nevertheless, the propeller blades in such design are only fixed by the screws, and positions of the propeller blades in the rotational direction are not limited. As a result, the propeller blades might not be able to fully unfold when the centripetal force generated from rotation is insufficient. Moreover, the efficiency Of fixation of the propeller blades in such design is lower, leading to the worse transmission efficiency of driving force and the propeller blades easily being loosened and damaged. As for detachable propeller blades, the propellers are fixed through a male thread and a female thread. In this design, the propeller blades may be directly removed from the motor through rotation for the convenience of storage. Nevertheless, the design uses the rotational direction of the propeller blades being opposite to the fastening direction of the screw set to fasten the propeller blades as the motor operates but make the propeller blades loose through inertial rotation as the rotation slows down. As for another type of detachable propeller blades, the motor and the propeller blades are coordinated into a buckling structure to perform the detachment of the propeller blades. However, the buckling structure generally limits a re-bound of the buckles of the propeller blades using the elastic piece on the motor, easily resulting in problems such as elastic fatigue, enlargement of gaps, abrasion, etc. after long hours of use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a rotating apparatus that has a steady structure and is easy for storage.

Other advantages and purposes of the invention can be further learned from the technical features disclosed.

To achieve one, some, or all of the purposes mentioned above or other purposes, an embodiment of the invention provides a rotating apparatus including a rotating assembly and a position-limiting assembly. The rotating assembly includes a driving unit and at least one rotating component. The at least one rotating component is connected to the driving unit. The driving unit is adapted to drive the rotating component to rotate relative to the driving unit with a first axis. The position-limiting assembly includes a position-limiting component, at least one first column, and a buckling component. The position-limiting component is disposed on the rotating assembly and is adapted to limit a position of the rotating component. The at least one first column is connected to the position-limiting component. The position-limiting component is located between the rotating component and the buckling component and is able to move relative to the at least one first column along the first axis. The buckling component is movably disposed on the position-limiting component and has at least one buckling portion. The buckling portion is buckled to the at least one first column and prevents the position-limiting component from leaving the rotating component along the first axis when the buckling component moves to a buckling position. The buckling portion is separated from the at least one first column and releases the position-limiting component when the buckling component moves to a first releasing position.

Based on the above, an embodiment of the invention has at least one of the advantages or effects stated below. In the rotating apparatus of the invention, the position-limiting component on the rotating component is configured to limit a position of the rotating component, so as to fix the rotating component in an unfolded status. The buckling component on the position-limiting component is configured to prevent the position-limiting component from leaving the rotating component, so as to steadily fix the rotating component. Moreover, the buckling component is able to move to release the position-limiting component, such that the position-limiting component may move away from the rotating component. The rotating component is thereby able to be folded relative to the driving unit into a folded status, such that the rotating apparatus is easy for storage.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
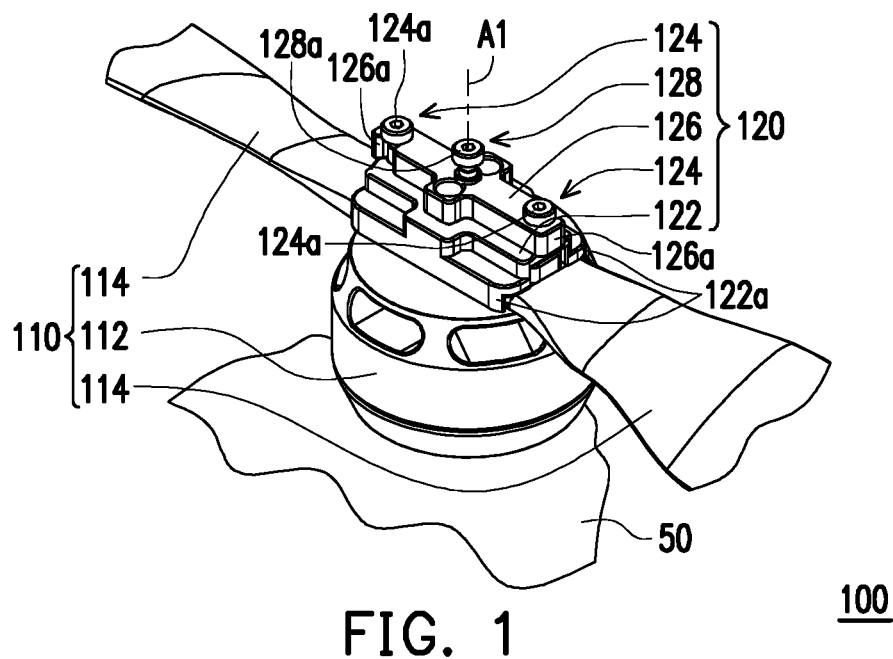
FIG. 1 is a three-dimensional schematic of a portion of a rotating apparatus in an embodiment of the invention.
Figure 2:
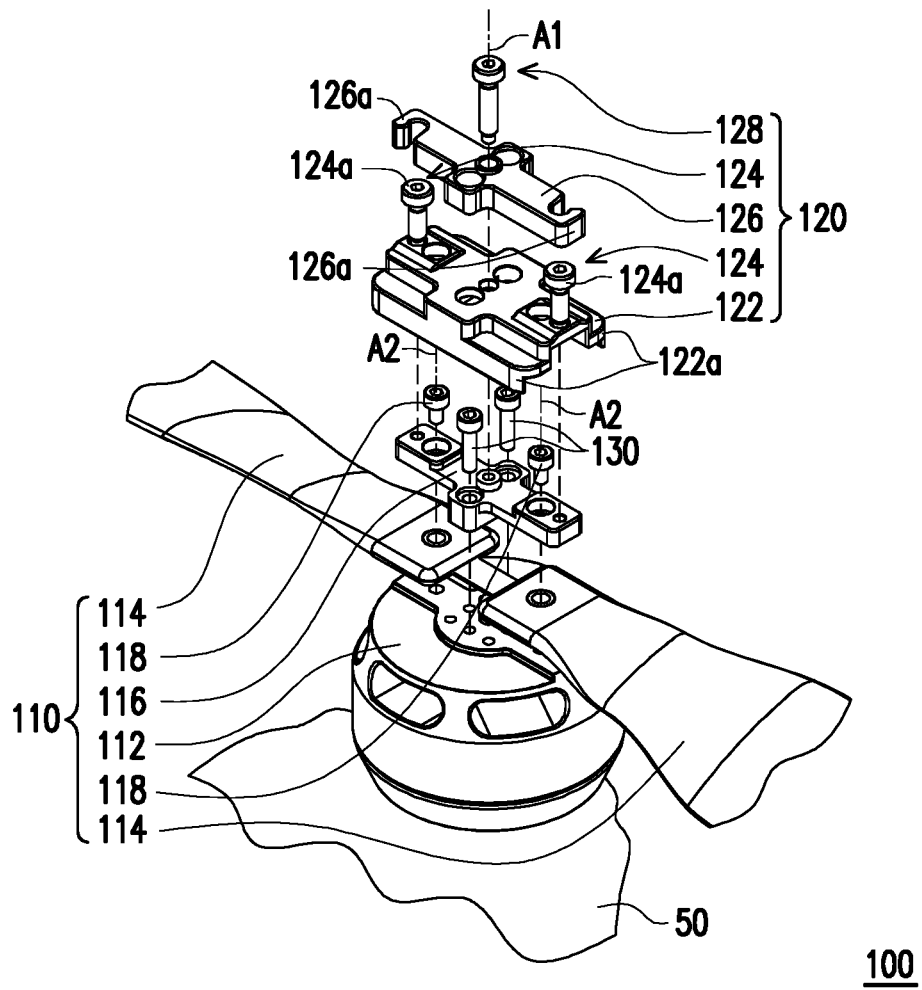
FIG. 2 is a decomposition chart of the rotating apparatus of FIG. 1.

FIG. 1 is a three-dimensional schematic of a portion of a rotating apparatus in an embodiment of the invention. FIG. 2 is a decomposition chart of the rotating apparatus of FIG. 1. Referring to FIG. 1 and FIG. 2, a rotating apparatus 100 in this embodiment is, for example, an unmanned aerial vehicle (UAV). The rotating apparatus 100 includes a main body 50, a rotating assembly 110, and a position-limiting assembly 120. The main body 50 is, for example, an airframe of an unmanned aerial vehicle. The rotating assembly 110 is, for example, a propeller assembly of an unmanned aerial vehicle and includes a driving unit 112 and at least one rotating component 114 (two are depicted in the drawings). The driving unit 112 is, for example, a motor and is disposed on the main body 50. Each of the rotating components 114 is, for example, a propeller blade and an end portion (not labelled with numerals) of each of the rotating components 114 is connected to the driving unit 112. The driving unit 112 is adapted to drive the rotating components 114 to simultaneously rotate relative to the driving unit 112 with a first axis A1 serving as a rotational axis, so as to provide a flying force to the rotating apparatus 100. The position-limiting assembly 120 is disposed on the rotating assembly 110. The position-limiting assembly 120 is driven to rotate relative to the driving unit 112 when the driving unit 112 drives the rotating components 114.

Moreover, the end portion of each rotating components 114 is connected to the driving unit 112 with a second axis A2 that is parallel to the first axis A1. Each of the rotating components 114 is able to respectively rotate relative to the driving unit 112. Accordingly, users may adjust each of the rotating components 114 to an unfolded or folded status. Detailed descriptions are provided as follows.

The position-limiting assembly 120 includes a position-limiting component 122, at least one first column 124 (two are depicted in the drawings), and a buckling component 126. The position-limiting component 122 is disposed on the rotating assembly 110 and is adapted to limit each of the rotating components 114 rotating relative to the driving unit 112 with the second axis A2. Each of the first columns 124 is, for example, a screw and is connected to the position-limiting component 122. The position-limiting component 122 is slidably disposed on the first columns 124 and is located between each of the rotating components 114 and the buckling component 126. An extending direction of each of the first columns 124 is parallel to the first axis A1. Thereby, the position-limiting component 122 is able to move in a direction away from each of the rotating components 114 or in a direction toward each of the rotating components 114 along the first axis A1.

Figure 3A:
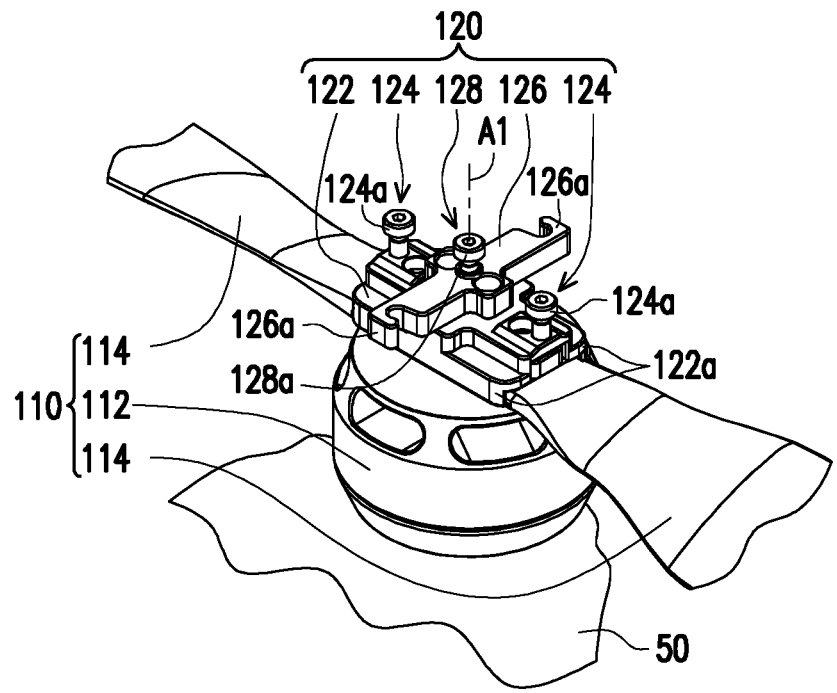
FIG. 3A depicts a buckling component of FIG. 1 releasing a position-limiting component.
Figure 3B:
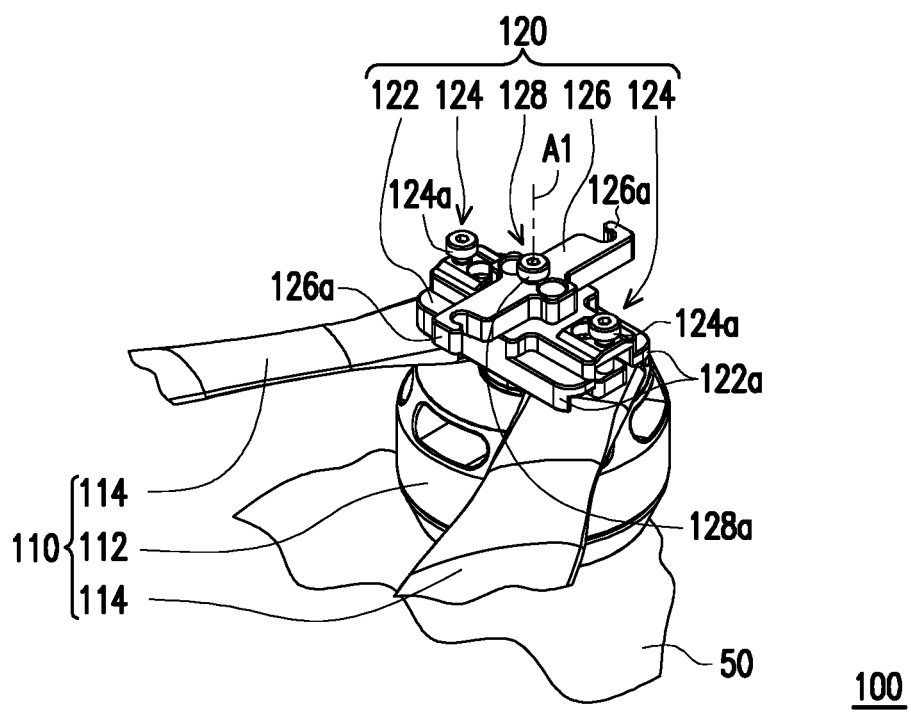
FIG. 3B depicts the position-limiting component of FIG. 3A releasing the rotating component and the rotating component folding into a folded status.

FIG. 3A depicts a buckling component of FIG. 1 releasing a position-limiting component. FIG. 3B depicts the position-limiting component of FIG. 3A releasing the rotating component and the rotating component folding into a folded status. The buckling component 126 is movably disposed on the position-limiting component 122 and has at least one buckling portion 126a. The buckling portion 126a is correspondent to a disposing position of the first column 124 on the position-limiting component 122. Two buckling portions 126a are depicted in this embodiment and the two buckling portions 126a are respectively located on two opposite end portions of the buckling component 126. In other embodiments, a number of the buckling portion 126a is only required to be correspondent to a number of the first column 124 and may be one or more, and the invention is not limited thereto. The two buckling portions 126a of the buckling component 126 are respectively buckled to the two first columns 124 and prevent the position-limiting component 122 from moving in a direction away from the rotating components 114 along the first axis A1 when the buckling component 126 moves to a buckling position shown in FIG. 1. The position-limiting component 122 prevents the rotating component 114 from rotating with the second axis A2, such that the rotating component 114 is steadily fixed in an unfolded status shown in FIG. 1. The two buckling portions 126a of the buckling component 126 are separated from the two first columns 124 and release the position-limiting component 122 when the buckling component 126 moves to a first releasing position shown in FIG. 3A, such that the position-limiting component 122 is able to move in a direction away from the rotating components 114 along the first axis A1 as shown in FIG. 3B.

That is to say, the position-limiting component 112 is adapted to move along the first axis A1 between a position-limiting position shown in FIG. 1 and FIG. 3A and a second releasing position shown in FIG. 3B. In other words, the position-limiting component 122 is able to move along the first axis A1 in a direction toward the rotating components 114 to the position-limiting position shown in FIG. 1 and FIG. 3A and in a direction away from the rotating components 114 to the second releasing position shown in FIG. 3B. The position-limiting component 112 limits a position of the rotating component 114 to an unfolded position shown in FIG. 1 and FIG. 3A when the position-limiting component 122 moves to the position-limiting position shown in FIG. 1 and FIG. 3A. The position-limiting component 122 separates the rotating component 114 when the position-limiting component 122 moves to the second releasing position shown in FIG. 3B, such that the two rotating components 114 are able to respectively rotate relative to the driving unit 112 with the corresponding second axes A2 to a folded position shown in FIG. 3B. The rotating apparatus 100 is thereby easy for storage.

More specifically, the position-limiting assembly 120 in this embodiment includes a second column 128. The second column 128 is, for, example, a screw and is connected to the rotating assembly 110, the position-limiting component 122, and the buckling component 126. The second column 128 is located on the first axis A1 and extends along the first axis A1. The buckling component 126 and the position-limiting component 122 are pivoted to the second column 128. Thereby, the buckling component 126 is rotatably disposed on the position-limiting component 122 with the first axis A1 and is adapted to rotate between the buckling position shown in FIG. 1 and the first releasing position shown FIG. 3A.

Figure 4:
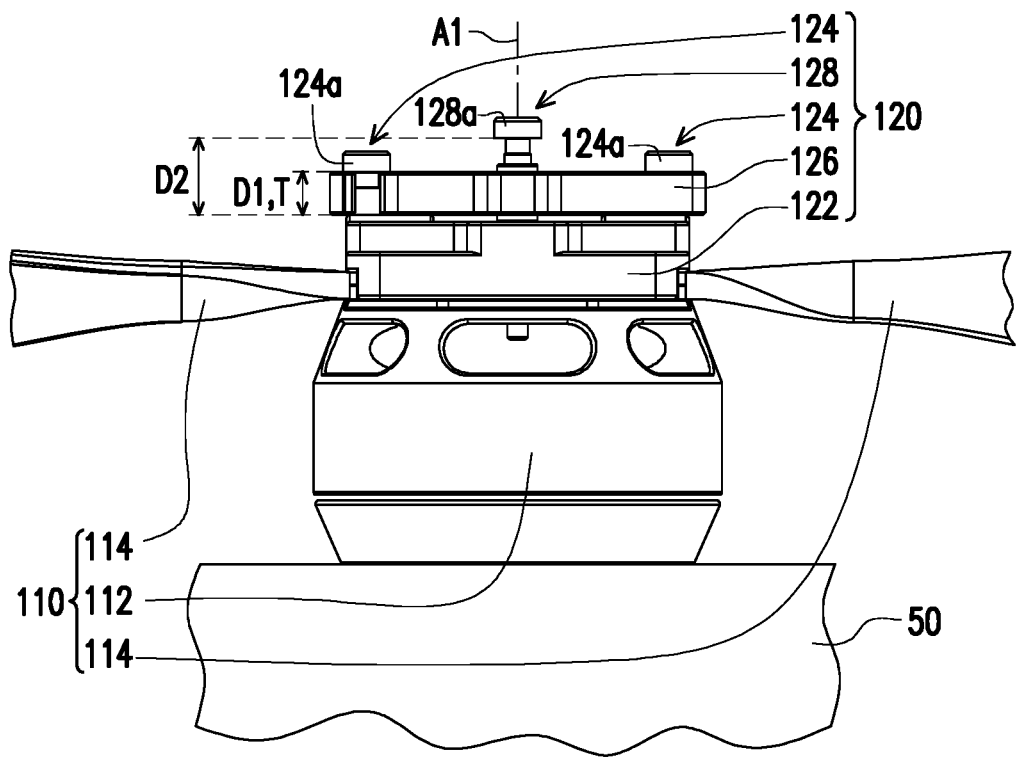
FIG. 4 is a schematic side-view of the rotating apparatus of FIG. 1.

FIG. 4 is a schematic side-view of the rotating apparatus of FIG. 1. In this embodiment, each of the first columns 124 has a first stop portion 124a. Each of the buckling portions 126a of the buckling component 126 is located between the first stop portion 124a of the corresponding first column 124 and the position-limiting component 122 when the buckling component 126 is located on the buckling position shown in FIG. 1 and FIG. 4. A distance D1 (labelled in FIG. 4) between each of the first stop portions 124a and the position-limiting component 122 is close to or equal to a thickness T of the corresponding buckling portion 126a (labelled in FIG. 4) of the buckling component 126. Thereby, a position of the buckling portion 126a is limited by the first stop portion 124a of the first columns 124 and the position-limiting component 122, and the buckling portion 126a is not able to move along the first axis A1. Additionally, the second column 128 in this embodiment has a second stop portion 128a. The buckling component 126 is pivoted between the second stop portion 128a and the position-limiting component 122. A distance D2 (labelled in FIG. 4) between the second stop portion 128a and the position-limiting component 122 is larger than a thickness T of the buckling component 126. Thereby, there is a space for the buckling component 126 to move along the first axis A1 when the buckling component 126 rotates from the buckling position shown in FIG. 1 and FIG. 4 to the first releasing position shown in FIG. 3A and FIG. 3B with the first axis A1, such that the position-limiting component 122 is released from the position-limiting position accordingly. The buckling component 126 and the position-limiting component 122 are able to simultaneously move relative to the second column 128 along the first axis A1 in a direction away from the rotating components 114 until the position-limiting component 122 moves to the second releasing position shown in FIG. 3B. Each of the rotating components 114 is released and rotates relative to the driving unit 112 with the second axis A2 from the unfolded status shown in FIG. 1 to the folded status shown in FIG. 3B.

In this embodiment, the first axis A1 is located between the two first columns 124. The two buckling portions 126a of the buckling component 126 are, for example, shaped as a hook. Opening directions of the two buckling portions 126a are opposite to each other as shown in FIG. 1. Thereby, the two buckling portions 126a are able to be buckled to the two first columns 124 in two opposite directions and against between the first stop portions 124a of the first columns 124 and the position-limiting component 122 as the buckling component 126 rotates along the first axis A1. The buckling portion 126a is tightly buckled to the corresponding first columns 124, so as to prevent the buckling component 126 from being loosened. The buckling component 126 rotating in an opposite direction along the first axis A1 makes the two buckling portions 126a simultaneously be separated from the two first columns 124. In other embodiments, the buckling component 126 may be buckled to or separated from the first columns 124 through other proper structures and movements. The invention does not set limitations in this regard.

In this embodiment, the position-limiting component 122 has two position-limiting walls 122a opposite to each other. The two position-limiting walls 122a are respectively against two opposite sides of the rotating component 114 when the buckling component 126 is located on the buckling position shown in FIG. 1 and the position-limiting component 122 is located on the position-limiting position shown in FIG. 1 and FIG. 3A, so as to stop the rotating component 114 from rotating relative to the driving unit 112 with the second axis A2 in a direction perpendicular to the first axis A1 and fix the rotating component 114 in the unfolded status. In other embodiments, the position-limiting component 122 may stop the rotating component 114 through structures of other proper forms, and the invention is not limited thereto.

Referring to FIG. 2, the rotating assembly 110 of this embodiment further includes a fixed component 116 and at least one third column 118 (two are depicted in the drawings). A number of the third column 118 is correspondent to the number of the rotating component 114. The fixed component 116 fixes the driving unit 112 through two fourth columns 130 (such as screws). The second column 128 is connected to the buckling component 126 and the position-limiting component 122 and is fixed on the fixed component 116. The buckling component 126 and the position-limiting component 122 are able to move between the second stop portion 128a of the second column 128 and the fixed component 116 along the first axis A1. The position-limiting component 122 moves relative to each of the first columns 124 along the first axis A1. The second column 128 is located on the first axis A1 and extends along the first axis A1. Each of the third columns 118 is, for example, a screw and is connected to the fixed component 116 and located on the second axis A2. End portions of the two rotating components 114 are respectively pivoted onto the fixed component 116 along the second axis A2 through the two third columns 118. Positions of the end portions of the two rotating components 114 are limited between the fixed component 116 and the driving unit 112. In other words, the end portion of each of the rotating components 114 is pivoted to the corresponding third column 118, such that each of the rotating components 114 rotates relative to the driving unit 112 and the fixed component 116 with the second axis A2. The position-limiting component 122 is against the fixed component 116 and a position of the end portion of each of the rotating components 114 is limited between the two position-limiting walls 122a when the position-limiting component 122 is located on the position-limiting position shown in FIG. 3A. In other embodiments, the rotating components 114 may be pivoted through other components, and the invention is not limited thereto.

Figure 5:
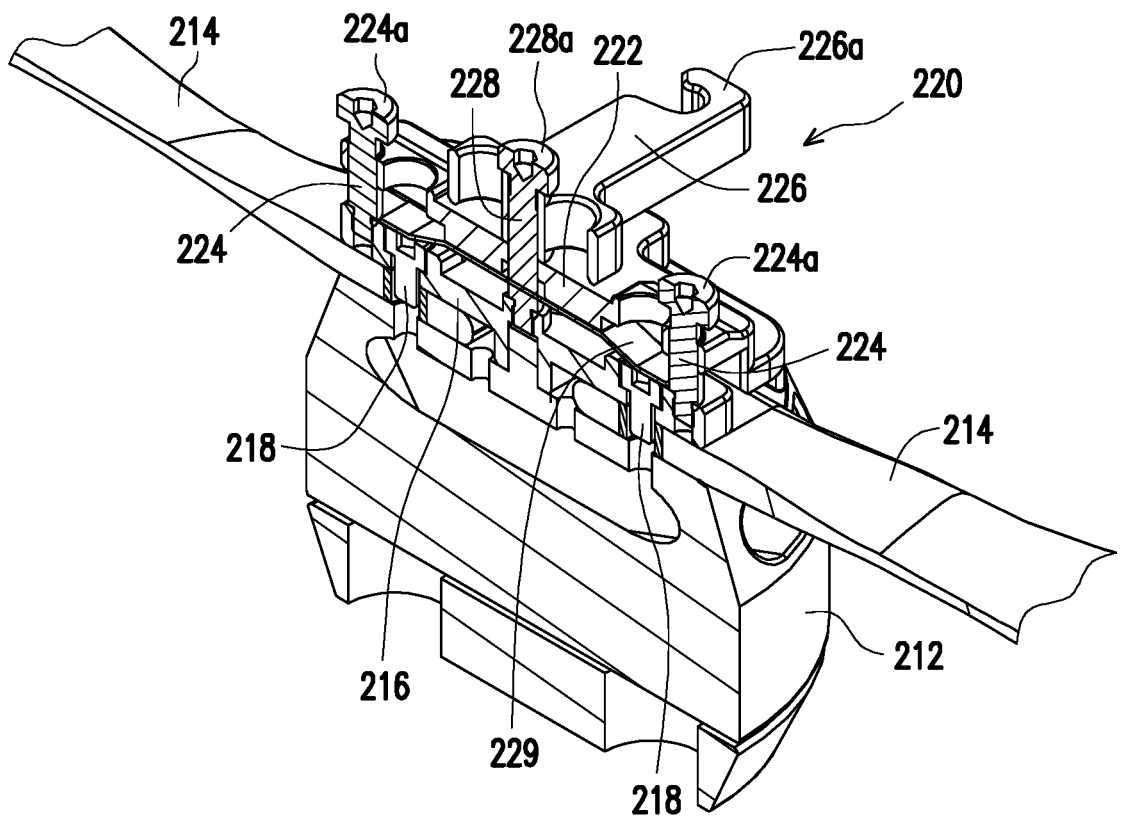
FIG. 5 is a three-dimensional schematic of a portion of a rotating apparatus in another embodiment of the invention.

FIG. 5 is a three-dimensional schematic of a portion of a rotating apparatus in another embodiment of the invention. In the embodiment depicted in FIG. 5, configurations and operations of a driving unit 212, at least one rotating component 214, a fixed component 216, at least one third column 218, a position-limiting component 222, at least one first column 224, at least one first stop portion 224a, a buckling component 226, at least one buckling portion 226a, a second column 228, and a second stop portion 228a are similar to the configurations and operations of the driving unit 112, the at least one rotating component 114, the fixed component 116, the at least one third column 118, the position-limiting component 122, the at least one first column 124, the at least one first stop portion 124a, the buckling component 126, the at least one buckling portion 126a, the second column 128, and the second stop portion 128a in the previous embodiment. The configurations and operations are not repeated here. A difference between the embodiment depicted in FIG. 5 and the previous embodiment lies in: the position-limiting component 220 further includes an elastic component 229. The elastic component 229 is, for example, a metal elastic piece and is disposed between the fixed component 216 and the position-limiting component 222. The elastic component 229 is, for example, fitted around the second column 228. The disposition of the elastic component 229 between the fixed component 216 and the position-limiting component 222 prevents gaps from forming between components as the buckling component 226 being ablated, so as to ensure the position-limiting component 222 is able to steadily limit a position of the rotating component 214.

In conclusion of the above, an embodiment of the invention have at least one of the advantages or effects stated below. In the rotating apparatus of the invention, the position-limiting component located on the rotating component is configured to limit a position of the rotating component, so as to fix the rotating component in an unfolded status. The buckling component on the position-limiting component is configured to prevent the position-limiting component from moving in a direction away from the rotating component, so as to steadily fix the rotating component. Moreover, the buckling component is able to move to the first releasing position to release the position-limiting component, such that the position-limiting component may move from the position-limiting position in a direction away from the rotating component to the second releasing position. The rotating component is thereby able to be folded relative to the driving unit into a folded status, such that the rotating component may be quickly folded and the rotating apparatus is easy for storage.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A rotating apparatus, comprising a rotating assembly and a position-limiting assembly,
the rotating assembly comprising a driving unit and at least one rotating component, wherein the at least one rotating component is connected to the driving unit, the driving unit is adapted to drive the at least one rotating component to rotate relative to the driving unit with a first axis;
the position-limiting assembly comprising a position-limiting component, at least one first column, and a buckling component, wherein the position-limiting component is disposed on the rotating assembly and is adapted to limit a position of the at least one rotating component, the at least one first column is connected to the position-limiting component, the position-limiting component is located between the at least one rotating component and the buckling component and is able to move relative to the at least one first column along the first axis, the buckling component is movably disposed on the position-limiting component and has at least one buckling portion, wherein the at least one buckling portion is buckled correspondingly to the at least one first column and stops the position-limiting component from moving away from the at least one rotating component along the first axis when the buckling component moves to a buckling position, and the at least one buckling portion is separated from the at least one first column and releases the position-limiting component when the buckling component moves to a first releasing position.

2. The rotating apparatus of claim 1, wherein the buckling component is rotatably disposed on the position-limiting component with the first axis, and the buckling component is adapted to rotate between the buckling position and the first releasing position.

3. The rotating apparatus of claim 2, wherein the position-limiting component comprises a second column, the second column is connected to the rotating assembly and the position-limiting component, the second column is located on the first axis and extends along the first axis, and the buckling component is pivoted to the second column.

4. The rotating apparatus of claim 1, wherein the at least one first column has a first stop portion, the at least one buckling portion is located between the first stop portion and the position-limiting component when the buckling component is located on the buckling position, and a distance between the first stop portion and the position-limiting component equals a thickness of the at least one buckling portion.

5. The rotating apparatus of claim 1, wherein the position-limiting assembly comprises a second column, wherein the second column is connected to the rotating assembly and the position-limiting component, the second column has a second stop portion, the buckling component is located between the second stop portion and the position-limiting component, and a distance between the second stop portion and the position-limiting component is larger than a thickness of the buckling component.

6. The rotating apparatus of claim 1, wherein a number of the at least one buckling portion of the buckling component is two, a number of the at least one first column is two, the first axis is located between the two first columns, and opening directions of the two buckling portions are opposite to each other, the two buckling portions are respectively buckled to the two first columns when the buckling component moves to the buckling position.

7. The rotating apparatus of claim 1, wherein the position-limiting component is adapted to move between a position-limiting position and a second releasing position along the first axis, the position-limiting component limits a position of the at least one rotating component when the position-limiting component moves to the position-limiting position, and the position-limiting component is separated from the at least one rotating component when the position-limiting component moves to the second releasing position.

8. The rotating apparatus of claim 7, wherein the position-limiting component limits the at least one rotating component to an unfolded status when the position-limiting component is located on the position-limiting position, and the at least one rotating component is adapted to rotate relative to the driving unit from the unfolded status to a folded status when the position-limiting component is located on the second releasing position.

9. The rotating apparatus of claim 1, wherein an extending direction of the at least one first column is parallel to the first axis, and the position-limiting component is slidably disposed on the at least one first column.

10. The rotating apparatus of claim 1, wherein the position-limiting component has two position-limiting walls opposite to each other, and the two position-limiting walls are respectively against two opposite sides of the at least one rotating component when the buckling component is located on the buckling position so as to stop the at least one rotating component in a direction perpendicular to the first axis.

11. The rotating apparatus of claim 1, wherein each of the at least one rotating component is connected to the driving unit with a second axis and is able to rotate relative to the driving unit when the buckling component is not located on the buckling position, and the second axis is parallel to the first axis.

12. The rotating apparatus of claim 11, wherein the position-limiting component is adapted to prevent each of the at least one rotating component from rotating with the second axis when the buckling component is located on the buckling position.

13. The rotating apparatus of claim 11, wherein the rotating assembly comprises a fixed component and at least one third column, the fixed component is fixed on the driving unit, the at least one third column is connected to the fixed component and is located on the corresponding second axis, the at least one rotating component is pivoted to the fixed component through the corresponding third column, and a position of the at least one rotating component is limited between the fixed component and the driving unit.

14. The rotating apparatus of claim 13, wherein a number of the at least one rotating component is two, a number of the at least one third column is two, and the two rotating components are respectively pivoted onto the fixed component through the two third columns.

15. The rotating apparatus of claim 14, wherein the two rotating components are adapted to respectively rotate relative to the driving unit with the corresponding second axes to a folded status.

16. The rotating apparatus of claim 1, wherein the rotating assembly is a propeller assembly, and the at least one rotating component is a propeller blade.

17. The rotating apparatus of claim 13, wherein the position-limiting assembly further comprises an elastic component disposed between the fixed component and the position-limiting component.

* * * * *